United States Patent
Knoedgen

(10) Patent No.: US 8,363,324 B2
(45) Date of Patent: Jan. 29, 2013

(54) LENS POSITIONING SYSTEM

(75) Inventor: Horst Knoedgen, Munich (DE)

(73) Assignee: Digital Imaging Systems GmbH, Kirchheim/Teck-Nabern (DE)

( * ) Notice: Subject to any disclaimer, the term of this patent is extended or adjusted under 35 U.S.C. 154(b) by 1048 days.

(21) Appl. No.: 12/008,347

(22) Filed: Jan. 10, 2008

(65) Prior Publication Data

US 2009/0180202 A1    Jul. 16, 2009

(30) Foreign Application Priority Data

Jan. 10, 2008   (EP) .................................. 08368001

(51) Int. Cl.
    *G02B 27/10*      (2006.01)
(52) U.S. Cl. ......... 359/619; 359/694; 359/695; 359/696
(58) Field of Classification Search .................. 359/619
    See application file for complete search history.

(56) References Cited

U.S. PATENT DOCUMENTS

| | | | |
|---|---|---|---|
| 5,623,708 A | 4/1997 | Watanabe | |
| 5,652,928 A | 7/1997 | Baxter et al. | |
| 5,825,560 A * | 10/1998 | Ogura et al. | 359/822 |
| 6,075,945 A * | 6/2000 | Akiike | 396/85 |
| 6,603,929 B2 | 8/2003 | Ishikawa et al. | |
| 7,003,222 B1 | 2/2006 | Murakami | |
| 7,006,137 B2 | 2/2006 | Kim et al. | |
| 2002/0135384 A1 | 9/2002 | Strack et al. | |
| 2003/0012568 A1 | 1/2003 | Ishikawa et al. | |

FOREIGN PATENT DOCUMENTS

| | | |
|---|---|---|
| EP | 0 586 023 A2 | 3/1994 |
| EP | 0 757 269 A1 | 2/1997 |
| EP | 08368001.7-1240 | 6/2008 |
| JP | 62220938 | 9/1987 |
| JP | 2003 185406 | 7/2003 |
| JP | 2007 199253 | 8/2007 |
| JP | 2007 316569 | 12/2007 |
| WO | WO 2007/141225 A1 | 12/2007 |

OTHER PUBLICATIONS

"Correlated Double Sampling in Capacitive Position Sensing Circuits for Micromachined Applications," by Wongkomet et al., XP-002486341, 1998 IEEE, pp. 723-726.

* cited by examiner

*Primary Examiner* — James Jones
(74) *Attorney, Agent, or Firm* — Saile Ackerman LLC; Stephen B. Ackerman

(57) ABSTRACT

Systems and methods to position most precisely a lens system of an optical device are disclosed. Embodiments of these electrical sensors comprise capacitive sensors, inductive sensors and resistive sensors to measure the actual position of a lens system with a precision of at least 1 µm. Read-out circuits using double-correlated sampling structures are providing the position signals from the electrical sensors to a controller. The controller compares the actual position signals with a set-signal representing a target position of the lens signal and issues a signal to a motor to get the lens system moved to the target position. A variety of motors/actuators can be used to move a slider carrying the lens system to the position desired.

20 Claims, 5 Drawing Sheets

LENS POSITIONING SYSTEM

BACKGROUND OF THE INVENTION (1) Field of the Invention

The present invention relates to optical devices and in particular to systems and methods to precisely move and control the position of lens systems of an optical device as e.g. cameras using electrical sensors to measure the actual position of the lens system.

(2) Description of the Prior Art

The positions of lenses e.g. in conjunction with autofocus (AF) cameras have to be controlled with utmost precision. Lenses have to be moved rapidly and precisely to the optimal position. Various and quite different implementations are in place to achieve such a positioning.

U.S. patent (U.S. Pat. No. 5,652,928 to Baxter et al.) discloses to use an auto ranging device to determine a lens destination focus position in term of a target number of signal pulses from a lens motion sensor photo-interruptor. A lens-drive motor is initially driven at maximum speed by a 100% pulse width modulated drive signal. At a fixed number of signal pulses in advance of the target, the average motor speed is calculated and a reduced pulse width modulated drive signal, determined based on the calculated motor speed, is applied to the drive motor to cause the lens to arrive at a uniform speed at a near destination focus position that is suitable for application of a standard motor stopping routine. During the motor stopping routine, the motor is initially "plugged" (reverse polarity drive signal) and the signal pulse period is monitored until a predetermined period is reached. At this point, the plug is removed and an electrical brake (short circuit) is applied to the motor to bring the lens to a rest at the destination focus position.

U.S. patent (U.S. Pat. No. 7,006,137 to Kim et al.) teaches a micro mode executing apparatus of a digital still camera having an image sensor and a focus-controlling lens connected to a focus driving motor and a spindle of the motor, thereby controlling an optical length within the range of a fixed barrel structure. A focus lens is positioned on the same optical axis as the image sensor and is secured to one end of the rotating axis of the spindle. A first biasing member is connected to the focus lens and the motor, and has a constant biasing force; and a second biasing member is provided for positioning the motor on the first step region for applying a biasing force in a lateral direction.

There are more known patents dealing with moving and positioning of lenses in optical devices:

U.S. patent (U.S. Pat. No. 6,603,929 to Ishikawa et al.) teaches a camera system comprising: a first focus detection unit, which detects the focusing condition of an image-taking optical system; a second focus detection unit, which detects the focusing condition of the image-taking optical system at a higher precision than the first focus detection unit; and a control circuit, which controls a stepping motor for driving a focus lens. The control circuit performs closed loop control for driving the stepping motor based on the output of a rotation detector, which detects the rotation phase of the stepping motor, when controlling the stepping motor using the information based on the output of the first focus detection unit, and performs open control for driving the stepping motor a predetermined number of steps at a time, when controlling the stepping motor using the information based on the output of the second focus detection unit. The autofocus process is thereby made high in speed and high in precision at the same time.

U.S. patent (U.S. Pat. No. 7,003,222 to Murakami) discloses a camera that maintains accuracy of stop position in accordance with the state of an image-taking optical system and allows driving of a focus lens to a target position in a short time period. The camera comprises a motor that drives the focusing lens, and a controller, which controls the motor such that the focusing lens is stopped at the target position by performing deceleration control in accordance with a predetermined deceleration control pattern. A zoom brush is serving as a state detector, which slides over a resistor in association with movement of the zooming lens to detect the position of the zooming lens. The controller changes the deceleration control pattern in accordance with the state of the image-taking optical system detected by the state detector.

U.S. patent (U.S. Pat. No. 5,623,708 to Watanebe) discloses a camera including an autofocus adjustment device. The autofocus device comprises a lens and camera body. The lens is comprised of a shooting lens, a lens information circuit, and a lens movement mechanism. The camera body has a main mirror, a submirror, an AF module, a sensor drive circuit, a controller, a lens drive control circuit, and motor. The autofocus adjustment device uses image plane movement velocity for the determination of a moving object and uses focus position change velocity in lens drive control.

SUMMARY OF THE INVENTION

A principal object of the present invention is to achieve methods and systems to position precisely a lens system of an optical device.

A further object of the present invention is to measure the position of a lens system in an optical device using electrical sensors.

A further object of the present invention is to measure the position of a lens system in an optical device using capacitive sensors.

A further object of the present invention is to measure the position of a lens system in an optical device using inductive sensors.

Another object of the present invention is to measure the position of a lens system in an optical device using resistive sensors.

A further object of the present invention is to use a read-out circuit using double-correlated sampling structures to sense precisely the position of a lens system.

In accordance with the objects of this invention a method to position a lens system of an optical device has been achieved. The method invented comprises, first, the following step of providing a lens system, which is mounted on a slider, an electrical motor, an arrangement of capacitive electrodes mounted on said lens system and on a camera housing, a read-out circuit defining the position of the lens system by amplifying the signals from said capacitive electrodes, and a controller. The following method steps are measuring the position of the lens system by said capacitive electrodes and by said read-out circuit, comparing the position measured with a target position and providing a signal according to the deviation, moving the lens system by the motor according to the deviation signal, and stopping the motor if target position is reached.

In accordance with the objects of this invention a system to position a lens system of an optical device has been achieved. The system invented comprises, first, a movable lens system, a capacitive sensor system to measure an actual position of said movable lens system, a read-out circuit using double correlated sampling structures, providing as output a signal dependent upon an output of said electrical sensor system, and a controller comparing the output signal of said read-out circuit with a set-point signal, wherein said set-point signal represents a target position of said lens system and wherein the output of the controller is a signal to a motor according to the distance required to move said lens system to a target position. Finally the system comprises a motor capable to move said lens system to a target position.

In accordance with the objects of this invention another method to position a lens system of an optical device has been achieved. The method invented comprises, first, the following step of providing a lens system, which is mounted on a slider, an electrical motor, inductive sensors mounted on said lens system and on a camera housing, a read-out circuit defining the position of the lens system by amplifying the signals from said capacitive electrodes, and a controller. The following steps of the method are measuring the position of the lens system by said inductive sensors and by said read-out circuit, comparing the position measured with a target position and providing a signal according to the deviation, moving the lens system by the motor according to the deviation signal, and stopping the motor if target position is reached.

In accordance with the objects of this invention another system to position a lens system of an optical device has been achieved. The system invented comprises, first, a movable lens system, an arrangement of inductive sensors to sense an actual position of said movable lens system, wherein a first part of said Inductive sensors is mounted on said movable lens system and a second part of said inductive sensors is mounted adjacently inside a camera housing. Furthermore the system invented comprises a read-out circuit, providing as output a signal dependent upon an output of said inductive sensor arrangement, a controller comparing the output signal of said read-out circuit with a set-point signal, wherein said set-point signal represents a target position of said lens system and wherein the output of the controller is a signal to a motor according to the distance required to move said lens system to a target position, and said motor capable to move said lens system to a target position.

In accordance with the objects of this invention another method to position a lens system of an optical device has been achieved. The method invented comprises, first, the following step of providing a lens system, which is mounted on a slider, an electrical motor, at least one resistive sensor to sense the actual position of the lens system, a read-out circuit defining the position of the lens system by amplifying the signals from said capacitive electrodes, and a controller. The next steps are measuring the position of the lens system by said resistive sensors and by said read-out circuit, comparing the position measured with a target position and providing a signal according to the deviation, moving the lens system by the motor according to the deviation signal, and stopping the motor if target position is reached.

In accordance with the objects of this invention another system to position a lens system of an optical device has been achieved. The system invented comprises, first, a movable lens system, a resistive sensor system to measure an actual position of said movable lens system, and a read-out circuit using double correlated sampling structures, providing as output a signal dependent upon an output of said resistive sensor system. Furthermore the system invented comprises a controller comparing the output signal of said read-out circuit with a set-point signal, wherein said set-point signal represents a target position of said lens system and wherein the output of the controller is a signal to a motor according to the distance required to move said lens system to a target position, and said motor capable to move said lens system to a target position.

BRIEF DESCRIPTION OF THE DRAWINGS

In the accompanying drawings forming a material part of this description, there is shown.

DESCRIPTION OF THE PREFERRED EMBODIMENTS

The preferred embodiments disclose methods and apparatus to move lenses of imaging devices fast and precisely to a position required in order to obtain an optimal quality of images. As non-limiting example such an imaging device might be an autofocus camera, wherein a focus lens must be brought to a focus position. The present invention can be applied for still and video cameras and for other optical devices requiring focusing or zooming. The actual position of a lens, which usually mounted in a lens barrel, is measured by electrical sensors. Three preferred embodiments are described, a first preferred embodiment is disclosing capacitive sensors, a second preferred embodiment is disclosing inductive sensors, and a third embodiment is disclosing resistive sensors.

Figure 1:
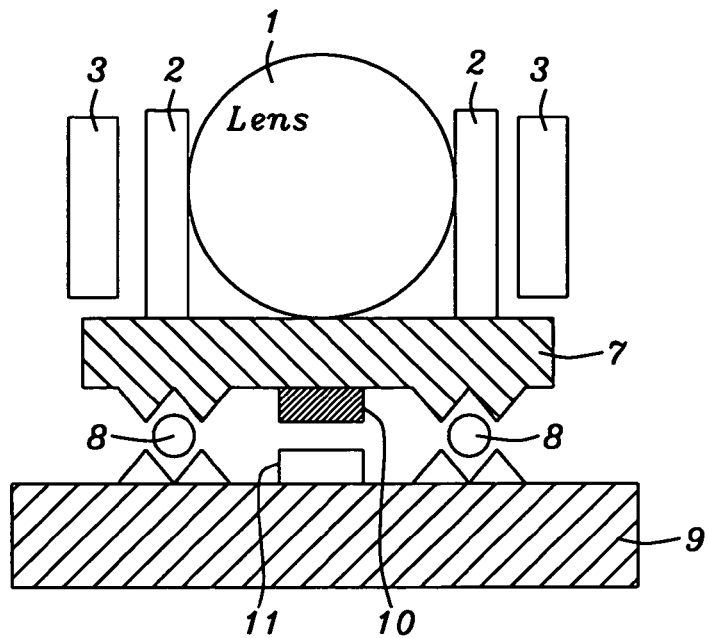
FIG. 1 illustrates an overview of the system invented.

FIG. 1 illustrates an overview of the system invented. A lens barrel 2 is containing an arrangement of one or more lenses 1. The lens barrel 2 is firmly connected to a slider 7. The slider 7 can be moved by a motor, comprising a magnet 10 and an inductor 11, which is comprising a coil and magnetic material as e.g. iron. The motor is a linear motor. The motor works together with a feed back loop. In order to achieve a soft sliding, sliding balls 8 are deployed between the slider 7 and a housing 9. Electrical signals can be transferred via these sliding balls 8. In order to keep the balls in a defined distance between each other, small balls having the function of distance holder can be deployed between larger balls enabling the slider to be moved easily. Other distance holders can also be arranged between the sliding balls 8. Furthermore it has to be ensured that the sliding balls do not touch an end stop of the range of movement of the sliding balls. This can be either achieved by feedback sensors 3 signaling if a position of the lens barrel close to an end stop is reached or by a magnet holding the balls away from an end stop.

The magnet 10 is firmly mounted on the slider 7 and is holding the lens system, comprising the arrangement of lenses 1 and the lens barrel 2, in a stable position after the desired position is reached and hence the inductor 11 is currentless. A feedback sensor 3 is measuring the actual position of the lens barrel 2 and is providing a signal indicating the current position of the lens system. The feedback sensor 3 senses the actual position of the lens barrel 2 either by capacitive, or inductive methods, i.e. dependent upon the type of feedback sensor 3 used either the capacitance or the inductivity of the feedback sensor is dependent upon actual position of the lens barrel 2. Using resistive sensors the movements of sliding balls 8 are measured using the resistance of a conductive track on which the sliding balls 8 are moved.

Figure 10:
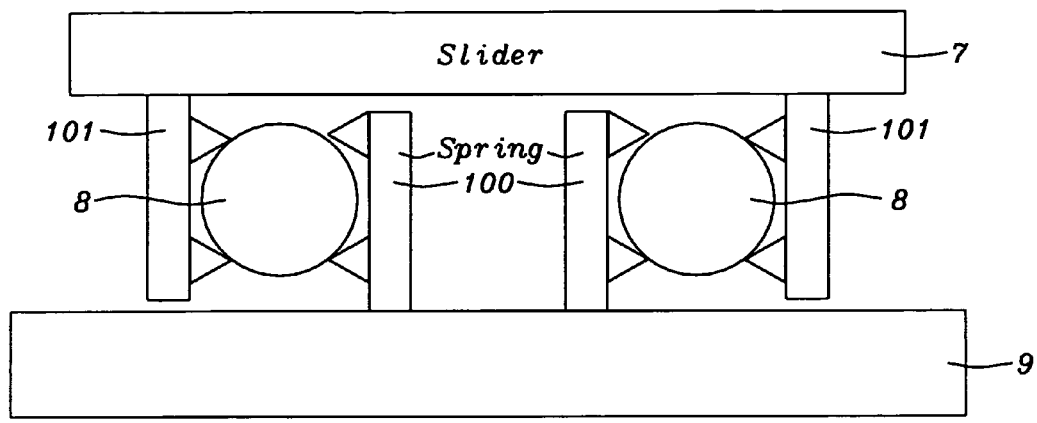
FIG. 10 illustrates a mechanical concept to achieve mechanical stability of the system and to guide a slider.

FIG. 10 illustrates a mechanical concept to achieve mechanical stability of the system and to guide slider 7. Spring guiding rails 100, mounted on the housing 9 of the imaging device are holding the sliding balls 8 on one side, while a stable guiding rail 101, holding the sliding balls on a side adjacent to the spring guiding rails 91 is firmly mounted on slider 7. Other forms of springs can be used as well.

Figure 2:
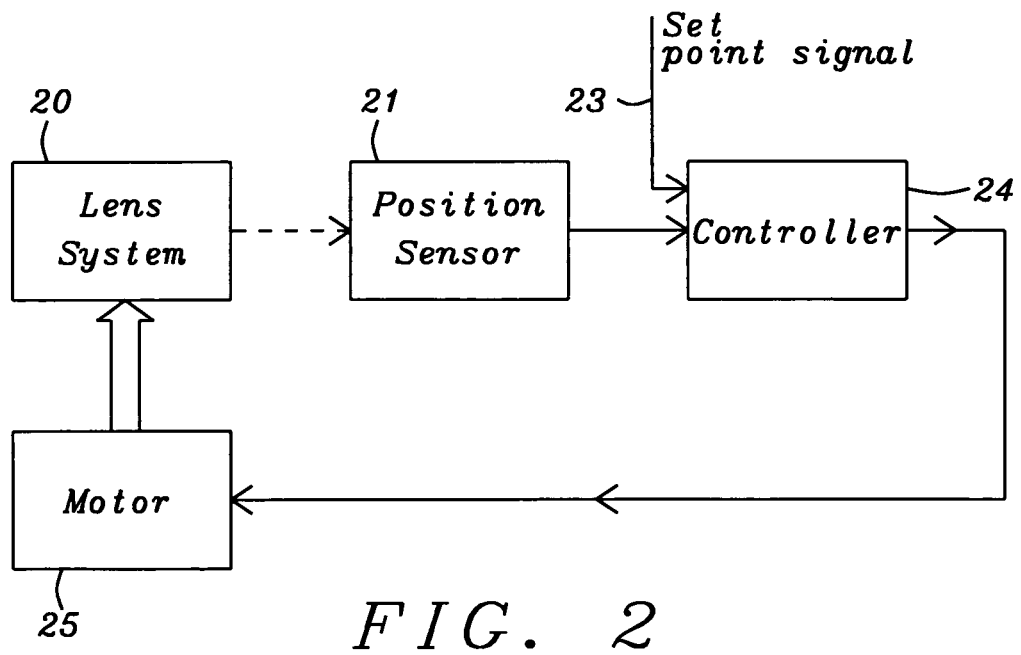
FIG. 2 shows generally the control loop of the present invention.

FIG. 2 illustrates generally the control loop of the present invention. The control loop comprises a lens system 20 to be positioned, position sensors 21 to measure the actual position of the lens system 20, a controller 24 is comparing a signal from the position sensors 21, representing the actual position of the lens system 20, with a set point signal 23. The set point signal 23 defines the target position of the lens system 20 and could be e.g. an output signal from an auto-focus sensor. The capacitive or inductive position sensors 21 will be described in more detail later.

Dependent upon the difference between the actual position of the lens system 20, defined by the output signal of the position sensors 21, and the target position, defined by set point signal 23, the controller 24 issues a control signal to the motor 25, which causes accordingly a movement of the lens system 20 in order to reach the target position. It should be noted that the motor is currentless in case the target position is reached and the magnet 10, shown in FIG. 1 is then holding the lens system 20 in a stable position.

Furthermore a speed control of the lens motor can be implemented, i.e. as the lens barrel is approaching closely the target position the motor is slowing down. This speed control can be easily achieved because the read-out frequency of the sensor is much higher than the reaction time of the motor. Also the controller knows the distance to be covered by the lens barrel and subsequently a ramp up and down for the motor can be implemented.

Figure 3:
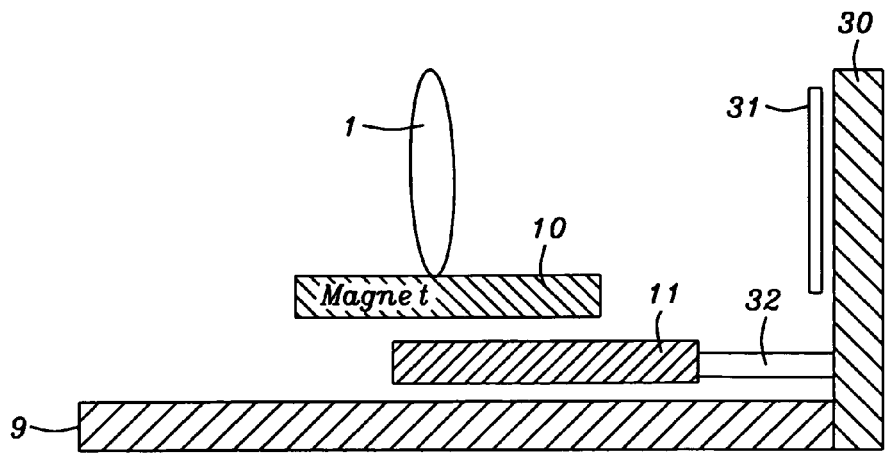
FIG. 3 illustrates a side view of the system invented.

In a first preferred embodiment of the invention capacitive sensors have been deployed to measure the actual position of the lens system. FIG. 3 illustrates a side view of the system invented. FIG. 3 shows a base plate 9, a coil 11, a magnet 10, and a lens 1. The same numerals have been used as for correspondent components of FIG. 1. Furthermore a sensor plate 30 is shown on which a sensor electrode of a capacitive sensor 31 is mounted. The coil 11 is connected via flexible wires to the sensor plate 30. Alternatively the ends of the coil can be soldered to the base plate and then further connected to the sensor plate 30. In order to avoid any tilting the motor can be implemented symmetrically, i.e. by using two coils and two magnets.

In this embodiment of the invention a piezoelectric motor can be alternatively used instead of a linear motor. Sliding balls may not be necessary if a high frequency motor is used in order to overcome static friction.

It is known that a distance can be measured by capacitive means. If a constant AC current flows through a sensor capacitor, the amplitude of the AC voltage at the sensor is proportional to the distance between the capacitor electrodes. The capacitor electrodes are formed by sensor electrodes having a fixed position in the camera and target electrodes on a lens barrel.

In a first preferred embodiment a sensor electrode is a small rectangular strip of metal, which can be printed on a plastic surface, e.g. on the plastic surface of the sensor plate 30 and correspondingly on the lens barrel as well. Any other shape of a capacitive sensor could be used as well.

Deviations of the absolute value of the capacitance of these sensor electrodes can be eliminated by a differential arrangement of the electrodes. A similar sensor electrode can be used for sensing a home position. The home position can be any mechanical position and is dependent upon the absolute value of the sensor electrodes.

Figure 4A:
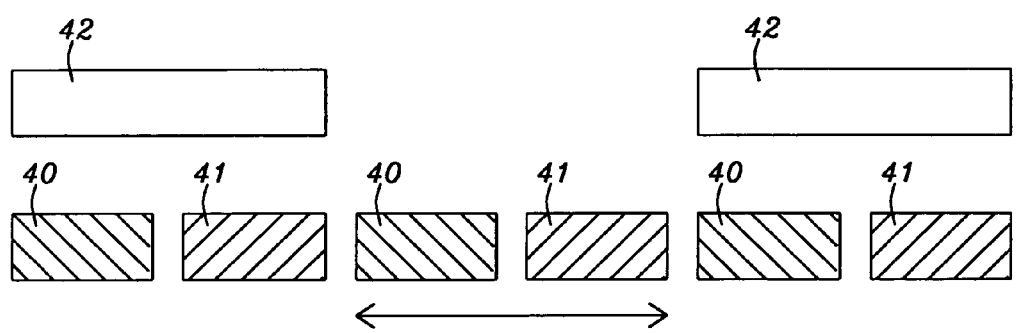
FIG. 4a illustrates a side view to target electrodes plates printed on the movable lens barrel and to the sensor electrode plates

FIG. 4a illustrates a side view to the target electrodes plates 40/41 printed on the movable lens barrel and to the sensor electrode plates 42, having a fixed position in the camera. The sensor electrode plates 42 are receiving negative pulses from target electrode plates 40 and positive pulses from target plates 41, wherein the target plates are mounted on the movable lens barrel. The capacitance between the sensor electrode plates 42 and the target electrode plates 40/41 is dependent upon the position of the target electrode plates 40/41 relative to the sensor electrode plates 42. All signals will be combined together in order to get an increased signal.

There are many alternatives available to connect the capacitive electrode on the lens barrel with the lens barrel. As an example a wire, which is connected to the capacitive electrode on the lens barrel and to the read-out circuit could be used. Another alternative could be electrical circuitry embedded in the plastic material of the lens barrel similar to a standard PCB.

A higher resolution for longer distances can be achieved by using two tracks of sensor capacitors with an angle of 90 degrees. Such an arrangement will provide a sine/cosine wave signal. The resolution of a printed track can be in the order of magnitude of 10 µm.

Figure 4B:
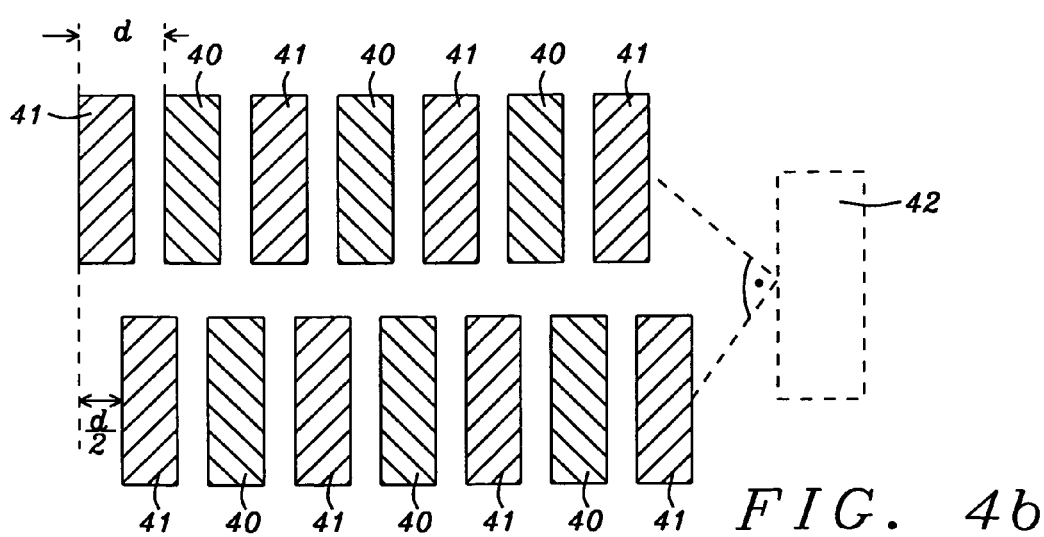
FIG. 4b shows a top view to two tracks of target electrode plates being located on a lens barrel and providing positive or negative sine/cosine wave signals

FIG. 4b shows a top view to two tracks of target electrode plates 40/41 being located on a lens barrel and providing positive or negative sine/cosine wave signals. By dotted lines indicated is a sensor electrode plate 42 having a fixed position in the camera over the target electrode plates 40/41 with an angle of 90 degrees relative to the target electrode plates 40/41. The distance between the front sides of two electrodes is signified by d. The second track of electrodes is shifted by half of said distance d.

The capacitance values of small capacitive electrodes are very low. Therefore special read-out and control circuit is required, which will be outlined later.

The number of electrode plates can be quite high. As a non-limiting example a plate can have a rectangular size in the order of magnitude of 200 µm×2 mm and is implemented 10 times in a row with a clearance of 2 mm. This will yield a controllable distance of 4 mm. A key point of the invention is that each plate has a different polarity compared to the neighboring plates and therefore the sense capacitor of the sensor plate receives a positive and a negative signal. Both positive and negative signal will give a clear signal. The interpolation of the sense capacitors will then provide the distance to be measured. It should be understood that any other than rectangular shapes could be used for the electrode plates as well. In a preferred embodiment a high number of relative small electrodes have been used in order to achieve a linear output signal indicating the actual position of the lens barrel. Any suitable shape of electrodes can be applied.

Figure 9:
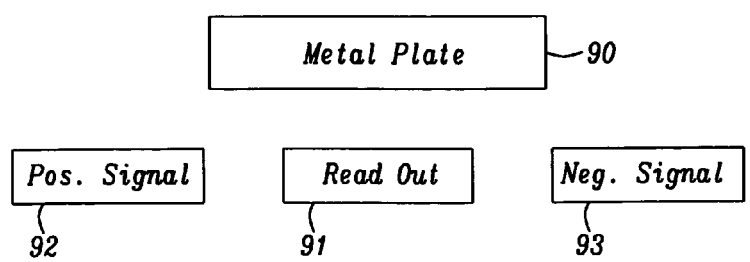
FIG. 9 shows an alternative implementation of capacitive sensors, wherein the capacitive electrodes have to be connected with a read-out circuit only on one side.

Turning to FIG. 9 another implementation of using capacitive sensors is shown. In this alternative embodiment of the present invention the capacitive electrodes have to be connected with a read-out circuit only on one side. This implementation of capacitive sensors is based on the reflection of a capacitor plate. FIG. 9 shows a metal reflector plate 90, which is mounted on preferably the moving lens barrel. Furthermore three active plates 91-93 are shown, i.e. a read-out plate 91, a plate providing a positive signal 92, and a plate providing a negative signal 93. All these active plates 91-93 have all a fixed position on the housing of the imaging device. This arrangement has the advantage that the sensor signals are coming from the side of the housing only and no wiring is required to and from the moving lens barrel. It is obvious that the metal reflector plate 90 could be alternatively on the housing side and the active plates could be mounted on the lens barrel but the wiring would be much more difficult in this case.

The active plates 91-93 are all at one side, preferably the housing side. The moving reflector plate 90 couples the signals from the positive driver plate 92 and negative driver plate 93 to the read-out plate 90. The value of the difference between the signal from the positive driver plate 92 and the signal from the negative driver plate 93 is proportional to the distances between both positive 92 and negative 93 driver plates and the reflector plate 90 and is hence proportional to the actual position of the lens barrel relative to the position of the read-out plate 91.

The apparatus invented is easy to be assembled, no clutch or no spring, are required and no sensitive gear wheels or spindles have to be mounted.

It is to be understood that the arrangement of electrodes can be performed in a very differently, as to e.g. which kind of plates are mounted on the lens barrel and which kinds of plates have a fixed position on the camera housing. Furthermore by removing plates at the end of movement allowable a secure operation without overriding a maximum range of lens positioning.

The read-out of the distance measurement has to be synchronized with the signals received by the sensor electrodes. It has to be understood that the capacitance of the sensors can be very small in the order of magnitude of a few femtofarads. A femtofarad corresponds to $10^{-15}$ Farad.

Figure 5:
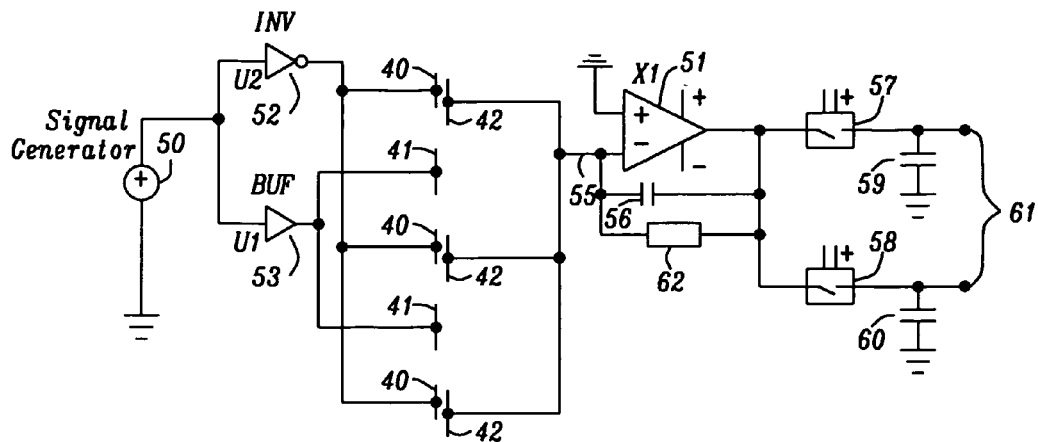
FIG. 5 illustrates the basic functions of a read-out circuit for a first preferred embodiment of the present invention using capacitive sensors.

FIG. 5 illustrates the basic functions of an exemplary read-out circuit for a first preferred embodiment of the present invention using capacitive sensors. The read-out has to be adjusted to the very low values of the sense capacitors. Therefore all sensor electrode plates 42 are connected to each other, thus achieving a stronger signal. By using a sine/cosine function, as discussed above, the square of both will be 1. This can be used for the gain of the read-out. A capacitor itself has no noise, only the switching noise. This switching noise can be suppressed in the electronic part by using double correlated sampling structures. In a preferred embodiment this is achieved by sample-and hold capacitors, which are driven alternately at a differential output.

The signals from the signal generator 50 are inverted by the inverting buffer 52 to feed the target electrode plates 40. The signals from the signal generator 50 are also fed by the buffer 53 to the target electrode plates 41. As described above the target electrode plates 40/41 are located on the lens barrel, which can be moved to a desired position. The sensor electrode plates 42 are connected together to the input of an operational amplifier 51. This operational amplifier 51 takes care of the amplification of the signals. The sensor capacitors 40 receive always a signal having an inverted polarity compared to sensor capacitors 41. The inversion of the signal is performed by inverting buffer amplifier 52. The signals together with the charge injections of capacitive sensors 40 and 41 form the negative input 55 of operational amplifier 51. The positive input of operational amplifier 51 is connected to a virtual ground. The feedback capacitor 56 together with resistor 62 provides feedback to the negative input of the operational amplifier 51.

A first signal with the charge injection will be stored on a first sample-and-hold capacitor, e.g. capacitor 59. Then the switch 57 will swing from ON to OFF, correspondingly switch 58 will swing to ON and the second signal will be stored at the other sample-and-hold capacitor 60.

The sample-and-hold capacitors 59 and 60 enable double correlated sampling. Both sample-and hold capacitors 59 and 60 are addressed by switches 57 and 58, which are both synchronized with signal generator 50. Signal 61 is a differential output signal. By using this technique, the KT/C noise, which is a thermal noise in the presence of filtering capacitors, will disappear.

In order to avoid unnecessary complexity only three sensor electrode plates 42 have been shown. Usually more than three sensor electrode plates are being used. It should be understood that, depending upon the distance to be covered, the number of target plate electrodes could be either higher, or equal, or lower than the number of sensor electrode plates. Furthermore, as indicated in FIG. 5, more target plate electrodes than sensor plate electrodes can be used.

A key point of the present invention is the accuracy of positioning achieved. Using a metal trace having a size of 2 mm×50 μm a resolution of 1 μm has been achieved. The following equations explain the accuracy achieved by the present invention:

Permittivity is a physical quantity that describes how an electric field affects and is affected by a dielectric medium. The vacuum permittivity (also called permittivity of free space or the electric constant) has a value of $\in_0 = 8.9 \times 10^{-14}$ Farad/cm or $\in_0 = 8.9 \times 10^{-18}$ Farad/μm The capacitance of a plate capacitor is proportional to the surface area of the conducting plate and inversely proportional to the distance between the plates. It is also proportional to the permittivity of the dielectric (that is, non-conducting) substance that separates the plates. In the case of the present invention the vacuum permittivity $\in_0$ outlined above is to be applied. The capacitance C of a parallel-plate capacitor is given by:

$$C = \frac{\varepsilon \times A}{s}, \qquad (1)$$

where $\in$ is the permittivity of the dielectric, A is the area of the plates and d is the spacing between them. Hence the distance d between plates is given by:

$$d = \frac{\varepsilon \times A}{C}.$$

Having, for example, a distance between both electrodes of 50 μm and using a metal trace as electrode having a size of 50

μm×2 mm will achieve, according to equation (1), a capacitor having a capacitance C of $$C = \frac{50 \mu m \times 2000 \mu m \times 8.9 \times 10^{-18} \text{Farad}}{50 \mu m^2} = 18.8 \, FF(femtofarad).$$

An interpolation using a factor 50 for a distance of 1 μm will require a resolution of 0.4 FF.

It has to be understood that the capacitive sensor plates can be mounted in a multitude of different arrangements. The capacitance of the sensor plates must be high enough to deliver a signal, which can be securely be amplified and processed further.

Figure 7:
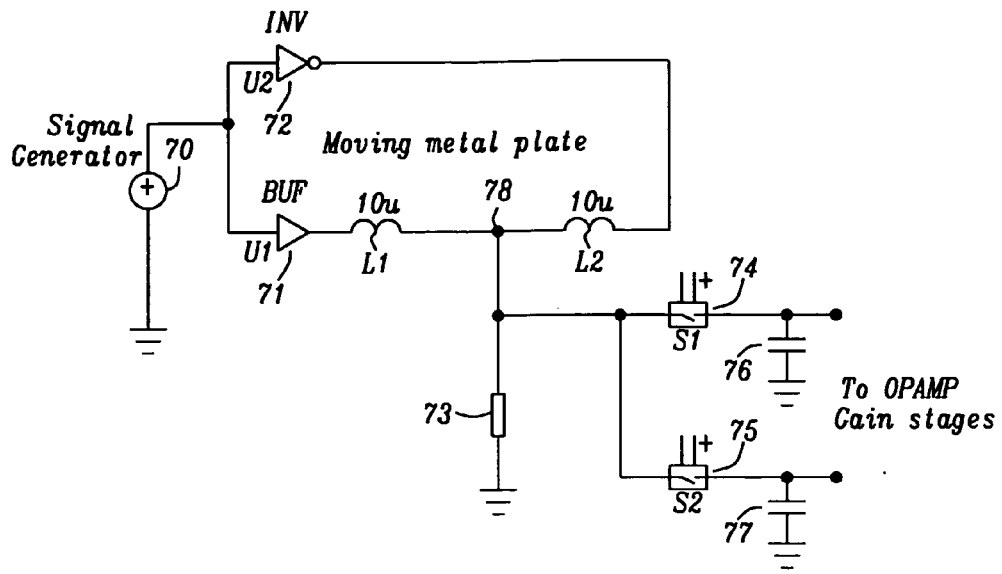
FIG. 7 illustrates the basic functions of a read-out circuit for a second preferred embodiment of the present invention using inductive sensors.

FIG. 7 illustrates as an example the basic functions of a second preferred embodiment of the present invention. The second preferred embodiment is using inductive sensors to measure the actual position of the lens barrel instead of the capacitive sensors of the first embodiment disclosed. In this embodiment of the invention a piezoelectric motor can be alternatively used instead of a linear motor. Sliding balls may not be necessary if a high frequency motor is used in order to overcome static friction. FIG. 7 shows the inductive sensors and a correspondent read-out circuit of the second embodiment of the present invention.

The second embodiment of FIG. 7 comprises, similarly to the first embodiment, a signal generator 70, connected to each of the input of a buffer amplifier 71 and an inverting buffer amplifier 72. The buffer amplifier 71 is connected to a coil L1 having an inductance, as a non-limiting example, of 10 μHenry (H). The inverting buffer amplifier 72 is connected to a coil L2 having also an inductance, as a non-limiting example, of 10 μHenry (H). Both coils L1 and L2 are connected to each other at the node 78.

Both coils L1/L2 have, similarly to the sensor plate electrode 42 of the first embodiment, a fixed position inside the camera. A metal plate 79, containing magnetic material as e.g. iron, which is fastened on a movable lens barrel, changes on approaching coil L1 the inductance of the coil L1 and causes a coupling of the inductance from coil L1 to L2; therefore the signal level at node 78 changes with the distance between the metal plate 79 and coil L1. The coils L1/L2 have the performance of a transformer, which is getting asymmetric whenever the metal plate 79 is approaching the coil L1. The amount of this asymmetry is a measure for the distance between the coil L1 and the metal plate 79, i.e. correspondent the distance between coil L1 and the lens barrel on which the metal plate is mounted. It should be understood that the approaching metal plate is changing the inductance of coil L1 as well the inductance of L2; both coils can be close together.

The resistor 73 between node 78 and ground is an option. Similarly to the first embodiment double correlated sampling structures are used by sample-and hold capacitors 76 and 77 which are driven alternately by switching means 74/75 to a differential output to be amplified by an operational amplifier (not shown). The switching means 74/75 can be a digital driver or could be implemented using small needles to reduce the current. The frequency of the signal generator 70 is depending of the inductor.

Furthermore it is to be understood that using the capacitive sensors of the first embodiment of the invention or using the inductive sensors of the second embodiment deviations of the height of the lens barrel versus the camera housing can be detected.

Figure 8:
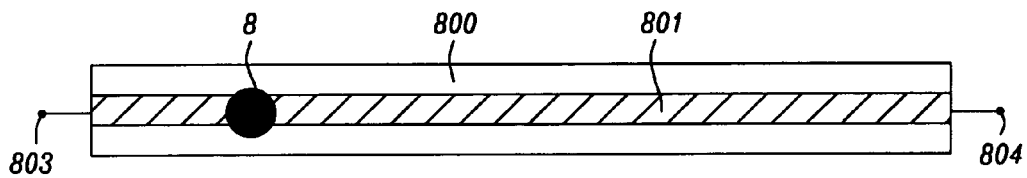
FIG. 8 illustrates the basic functions of a resistive sensor to sense the actual position of a lens barrel.

FIG. 8 illustrates as an example the basic functions of a third preferred embodiment of the present invention. The third preferred embodiment is using resistive methods to measure the actual position of the lens barrel instead of the capacitive sensors of the first embodiment or the inductive sensors of the second embodiment disclosed. These resistive methods are based on an arrangement of electrically conductive tracks below and above the sliding balls 8, made of electrically conductive material, which are moving between these electrically conductive tracks. FIG. 8 shows a principal design of an arrangement of sliding ball and the resistive method used.

FIG. 8 shows a top view of a track 800 on which a sliding ball 8, as shown in FIG. 1, is moving. The sliding ball 8 is made of electrically conductive material, as e.g. iron. Any other conductive material, being solid enough to hold, without being deformed, a slider 7 and a lens barrel 2 would be suitable as well. Directly underneath the sliding ball 8 is another track 801, which is of electrically conductive material having the function of a resistor. A first side of the electrically conductive track is connected to a positive voltage 803; a second side is connected to a negative voltage 804. The sliding ball 8 is moving along a second electrically conductive track (not shown) above the sliding ball. This second electrically conductive track has a much higher electrical conductivity than the track 801. Thus this arrangement of two conductive tracks and a sliding ball works like a potentiometer, the actual position of the sliding ball 8 can be measured by the voltage level of the second track above the sliding ball 8. The actual position of a sliding ball can be used as a measurement for the actual position of the lens barrel.

The conductive track with the function of a resistor can alternatively be arranged above the sliding ball and the track with a high conductivity be ranged below the sliding ball.

Figure 11:
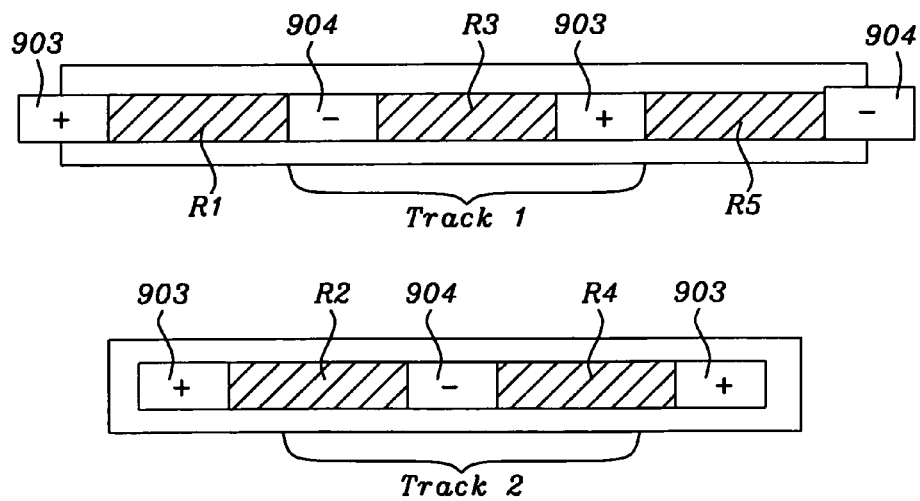
FIG. 11 illustrates an arrangement of two tracks of resistive sensors, wherein a first track is below sliding balls and a second track is above sliding balls.

FIG. 11 illustrates an arrangement of two tracks, wherein a first track is below sliding balls and a second track is above sliding balls. Multiple sliding balls connect the first track to the second track. A first track has resistive areas R1, R3, and R5, a second track has resistive areas R2 and R4. Areas 903 are connected to a positive supply voltage, areas 904 are connected to a negative supply voltage. Alternately the voltage level on a first track is measured, while the supply voltage on the second track is disconnected, then the voltage level on the second track is measured while the supply voltage on the first level is disconnected. This alternation of measurement on one track and then on the other track, while always the supply voltage on the opposite track is disconnected during a measurement, is performed with a much higher frequency compared to the speed of the motor A variety of other motors/actuators can be used alternatively to a linear motor described above in order to move a lens barrel.

A suitable alternative to a linear motor is a piezoelectric motor to move a lens barrel. A piezoelectric motor or piezo motor is a type of electric motor based upon the change in shape of a piezoelectric material when an electric field is applied. Piezoelectric motors make use of the converse piezoelectric effect whereby the material produces acoustic or ultrasonic vibrations in order to produce a linear or rotary motion. In one mechanism, the elongation in a single plane is used to make a series stretches and position holds, similar to the way a caterpillar moves.

An ultrasonic motor is a type of electric motor formed from the ultrasonic vibration of a component, the stator, placed against another, the rotor or slider depending on the scheme of operation (rotation or linear translation). Ultrasonic motors differ from piezoelectric actuators in several ways, though both typically use some form of piezoelectric material, most often lead zirconate titanate and occasionally lithium niobate or other single-crystal materials. The most obvious difference is the use of resonance to amplify the vibration of the stator in contact with the rotor in ultrasonic motors. Ultrasonic motors also offer larger rotation or sliding distances than piezoelectric actuators.

Another suitable type of actuators are polymer actuators as e.g. Conducting Polymer Actuator. Conducting polymers (CPs) expand and shrink with doping and dedoping, respectively, driven electrochemically, able to be used as actuators.

Figure 6:
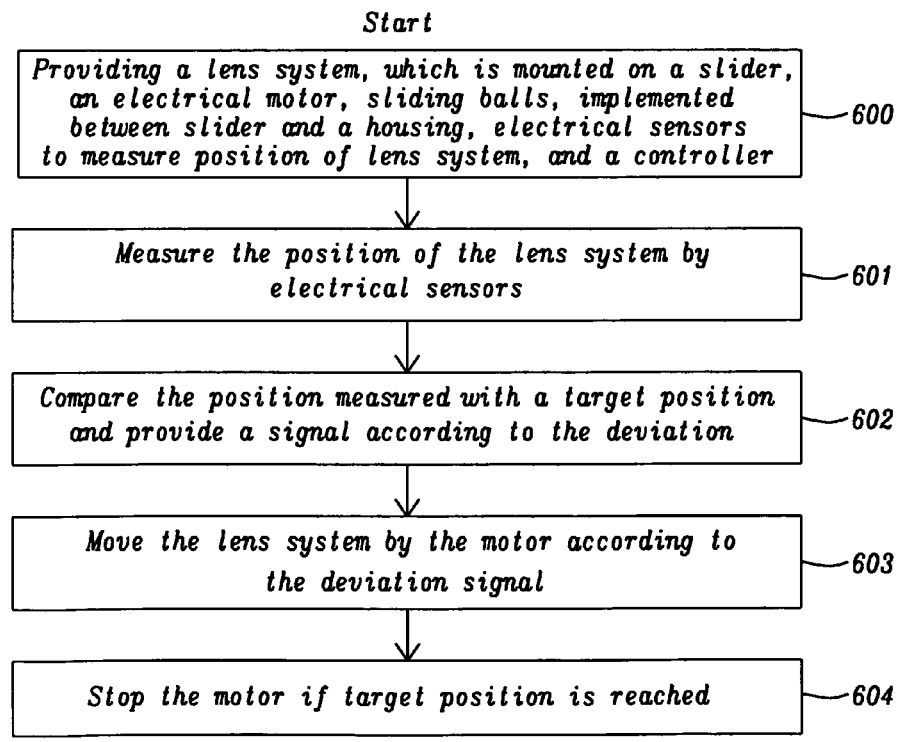
FIG. 6 illustrates a flow chart diagram of a method invented to position very precisely lenses of an imaging device.

FIG. 6 illustrates a flow chart diagram of a method invented to position very precisely lenses of an imaging device. Step 600 describes the provision of a lens system, which is mounted on a slider, an electrical motor, sliding balls, implemented between slider and a housing, electrical sensors to measure the position of the lens system, and a controller. Step 601 describes the measuring of the position of the lens system by the electrical sensors. These electrical sensors could be capacitive sensors, inductive sensors or sensors of other types. In step 602 the position measured is compared with a target position and a signal is provided according to the deviation between target position and the actual position measured. Step 603 illustrates the movement of the lens system by the motor according to the deviation signal. In step 604 the motor is stopped after the target position of the lens system is reached.

While the invention has been particularly shown and described with reference to the preferred embodiments thereof, it will be understood by those skilled in the art that various changes in form and details may be made without departing from the spirit and scope of the invention.

What is claimed is:

1. A method to position a lens system of an optical device comprises the following steps:
   providing an autofocus camera in which a positioning system moves a lens system for providing autofocus comprising the lens system, which is mounted on a slider, an electrical motor, inductive sensors mounted on said lens system and on a camera housing, a read-out circuit defining the position of the lens system by amplifying signals from capacitive electrodes, and a controller;
   measuring the position of the lens system by said inductive sensors and by said read-out circuit;
   comparing the position measured with a target position and providing a signal according to the deviation;
   moving the lens system by the motor according to the deviation signal; and
   stopping the motor if target position is reached.

2. The method of claim 1 wherein said inductive sensors are comprising two coils, mounted on a housing of said optical device, and a plate containing magnetic material, mounted on a lens barrel.

3. The method of claim 1 wherein said inductive sensors are comprising two coils, mounted on a lens barrel, and a plate containing magnetic material, mounted on a housing of said optical device.

4. The method of claim 1 wherein sliding balls are supporting the movement of said slider.

5. A system to position a lens system of an optical device, comprising:
   a movable lens system, wherein the positioning system moves the lens system for providing autofocus;
   an arrangement of inductive sensors to sense an actual position of said movable lens system, wherein a first part of said Inductive sensors is mounted on said movable lens system and a second part of said inductive sensors is mounted adjacently inside a camera housing;
   a read-out circuit, providing as output a signal dependent upon an output of said inductive sensor arrangement;
   a controller comparing the output signal of said read-out circuit with a set-point signal, wherein said set-point signal represents a target position of said lens system and wherein the output of the controller is a signal to a motor according to the distance required to move said lens system to a target position; and
   said motor capable to move said lens system to a target position.

6. The system of claim 5 wherein said first part of inductive sensors is comprising two coils and the second part of inductive sensors is comprising a plate containing magnetic material.

7. The system of claim 5 wherein said first part of inductive sensors is comprising a plate containing magnetic material and the second part of inductive sensors is comprising two coils.

8. The system of claim 5 wherein said read-out circuit is using double correlated sampling of the signals from said inductive sensors.

9. The system of claim 5 wherein said read-out circuit comprises
   a signal generator driving pulses to a buffer amplifier and an inverting buffer amplifier;
   said buffer amplifier having its output connected to a first terminal of a first coil;
   said inverting buffer amplifier having its output connected to a first terminal of a second coil;
   a metal plate containing magnetic material mounted on a lens barrel;
   said first coil, wherein a second terminal is connected to a second terminal of said second coil;
   said second coil;
   a resistor being connected between the second terminals of said first and second coils and ground;
   a first and a second switching means being arranged in parallel between the second terminals of said first and second coils and a differential output of said read-out circuit, wherein both said switching means are synchronized by said signal generator and are alternately opened and closed; and
   a first and a second sample-and-hold capacitor, wherein the first sample-and-hold capacitor is deployed between a first terminal of said differential output and ground and the second sample-and-hold capacitor is deployed between a second terminal of said differential output and ground.

10. The system of claim 5 wherein said motor is a linear motor.

11. The system of claim 5 wherein said motor is a piezo motor.

12. The system of claim 5 wherein said motor is a stepper motor.

13. The system of claim 5 wherein said motor is a polymer actuator.

14. The system of claim 5 wherein said slider can be moved using sliding balls.

15. The system method of claim 5 wherein a magnet is holding the lens system in a stable position after the target position is reached.

16. The system of claim 5 wherein spring guiding rails, mounted on a housing of the optical device are holding the sliding balls on one side, while a stable guiding rails, holding sliding balls on a side adjacent to the spring guiding rails is firmly mounted on the slider.

17. A system to position a lens system of an autofocus optical device, comprising:
- a fixed unit comprising a housing member, an inductor member comprising a coil member, and a magnetic member, and guiding rail members;
- a moving unit comprising a moving support member slidable relative to the fixed unit, a lens barrel member having at least one lens element, wherein the positioning system moves the at least one lens element for providing autofocus, guiding rail members, and a magnetic member generating a magnetic force in conjunction with the magnetic member of the fixed unit to hold the fixed unit and moving as an actuator the moving unit by electromagnetic interaction with the coil member; and
- sliding ball members rolling with the guiding rails to move the moving unit including the lens barrel along an optical axis.

18. The system of claim 17 wherein the positioning system comprises inductive sensor members mounted on to the housing member and on the moving unit.

19. The system of claim 17 wherein the coil member of the fixed unit is being used as the inductive sensor member.

20. The system of claim 17 further comprising a control circuit controlling a positioning system comprising a closed loop control algorithm to continuously measure an actual position, comparing the result with the target position, calculating a deviation, and moving the moving unit member by the actuator according to the deviation, back to the target position.

* * * * *